United States Patent [19]

Badger et al.

[11] Patent Number: 4,822,412
[45] Date of Patent: Apr. 18, 1989

[54] METHOD OF REMOVING LITHIUM FROM ALUMINUM-LITHIUM ALLOYS

[75] Inventors: Douglas V. Badger, Federal Way; Billy L. Small, Seattle; Philip K. Stanfeld, Kent, all of Wash.

[73] Assignee: The Boeing Company, Seattle, Wash.

[21] Appl. No.: 932,177

[22] Filed: Nov. 17, 1986

[51] Int. Cl.⁴ .............................. C22B 21/06
[52] U.S. Cl. ........................... 75/63; 75/68 R
[58] Field of Search ........................ 75/63, 68 R

[56] References Cited

U.S. PATENT DOCUMENTS

| | | | |
|---|---|---|---|
| 710,493 | 10/1902 | Moeser et al. | |
| 1,180,435 | 4/1916 | Robison. | |
| 2,028,390 | 1/1936 | Hanson | 75/66 |
| 2,195,217 | 3/1940 | Lindenberger et al. | 75/68 |
| 2,470,305 | 5/1949 | Gross | 75/68 B |
| 2,621,120 | 12/1952 | Pedersen et al. | 75/68 B |
| 2,810,635 | 10/1957 | Cooper | 75/66 |
| 3,397,056 | 8/1968 | Layne et al. | 75/68 B |
| 3,856,511 | 12/1974 | Becker et al. | 75/68 B |
| 4,337,929 | 7/1982 | Evans | 75/68 R |

FOREIGN PATENT DOCUMENTS

| | | | |
|---|---|---|---|
| 65854 | 12/1982 | European Pat. Off. | 75/68 R |
| 623932 | 5/1949 | United Kingdom. | |
| 635318 | 4/1950 | United Kingdom. | |

*Primary Examiner*—Melvyn J. Andrews
*Attorney, Agent, or Firm*—Eugene Heberer; Joan H. Pauly; Delbert J. Barnard

[57] ABSTRACT

The invention is a method of removing lithium from aluminum-lithium alloys. Aluminum-lithium alloys (64) and a metal halide flux (68) are fed into a rotary furnace (10) at a raised and cool end thereof. The temperature at the cool end is above that of the melting point of the flux (68) and below that of the melting point of the alloy (64). The flux is thus melted as it enters the furnace. It coats the solid alloy and the furnace refractory lining (46) to prevent contact between the refractories and the molten metal unitl the lithium content of the aluminum has been reduced to an acceptable level. A rotation of the furnace moves the alloy (64) and molten flux (68) toward a lower and hotter end at which the temperature is such to melt the aluminum. At this time the lithium is removed from the alloy (64) and is absorbed within the flux (68). The aluminum (70) is then drained from the furnace at its lower end.

14 Claims, 1 Drawing Sheet

METHOD OF REMOVING LITHIUM FROM ALUMINUM-LITHIUM ALLOYS

TECHNICAL FIELD

This invention relates to reclaiming aluminum-lithium scrap for use in secondary casting alloys by the removal of lithium from the original aluminum lithium alloy.

BACKGROUND ART

Aluminum alloys containing lithium are significantly less dense than conventional aluminum alloys and thus offer weight savings of around 10% for airplane structures in alloys containing between 2% and 2½% of lithium. At present it is considered that aluminum alloys containing more than about 2½% of lithium tends to weaken the alloy so that it would not be acceptable for us in commercial aircraft. Aluminum lithium alloys are now becoming available on a commercial basis and are being considered for use on current and future airplanes.

Aluminum ores are widely available, but the extraction process is energy-intensive and the cost of aluminum metal is largely dependent upon the expenses incurred during extraction. For this reason scrap aluminum alloys are of substantial economic importance, particularly in view of the fact that a large airplane manufacturer would have something of the order of 30 million pounds of aluminum scrap available for sale each year.

Normally, commercial aluminum scrap is recycled and converted back to usable form at a fraction of the cost of producing virgin metal. Primary producers generally reprocess their own scrap, but scrap produced by their customers is normally sold to secondary producers who process it into a variety of alloys, which are mainly used for casting purposes.

Aluminum-lithium alloys, however, present a special problem in that they are very reactive when molten, oxidize readily in air, and attack the refractories in furnace linings. It has, therefore, been postulated by the major primary producers that considerable difficulty could be encountered by secondary producers in attempting to reclaim aluminum lithium alloys by normal methods. They have also claimed that contamination of other alloys by small amounts of lithium could seriously affect their mechanical properties and render them unsuitable for die-casting processes.

The currently recommended procedure of one primary producer is to strictly segregate all aluminum-lithium scrap from other aluminum scrap in order to prevent cross-contamination. Furthermore, it is recommended that all aluminum-lithium scrap be recycled only by primary producers who need to be assured that it is not contaminated, and that if more than one aluminum-lithium alloy composition is used, they must be separated from each other. Such requirements are extremely costly in terms of man power, facilities, and transportation and could eliminate much scrap from the secondary market when aluminum-lithium becomes widely used.

If the advice of the primary producer or producers must be followed, the only alternative to recycling through the primary producers is to eliminate all aluminum-lithium material from the scrap loop by methods such as burial. This would still require segregation from other alloys and there would still be a risk of accidental contamination of the more conventional alloys by aluminum lithium alloys.

As indicated above, recycling of aerospace alloys into the secondary aluminum market is a multimillion dollar industry and elimination of such recycling would have a significant economic impact on aerospace production costs.

A search of the patent literature was made to attempt to find a method for the removal of lithium from aluminum-lithium alloys. No specific solution was found but U.S. Pat. No. 2,195,217 to Lindenburger et al. disclosed a method for reducing the metallic magnesium content of aluminum alloys. The invention in this patent was the discovery that slag forming materials such as alkali metal halides have the property of extracting magnesium from aluminum alloys. It was found to be important to provide for intimate contact between the slag-forming material and the aluminum-magnesium alloy while both were in a molten state. The process is carried out at a temperature above the melting point of both materials at temperatures of 1400° F. to 1700° F. or preferably from slightly above 1500° F. to 1600° F. An agitator arm, or other mixing device is used to insure intimate contact between the molten metal and the slag. In an example given, a charge of 10 lbs. of sodium chloride was placed in a crucible and melted and then 50 lbs. of an aluminum-magnesium alloy were added thereto. When the entire charge was melted, a temperature of 1450°–1500° F. being utilized, it was stirred vigorously for 30 minute. The metal was then drawn off from the slag and on analysis was found to contain less than 0.01% magnesium. For larger batches rotary furnaces were suggested. The order of the mixing of the metal and the slag was considered to be optional although it was preferred to provide a molten mass of the slag forming material and charge the metal thereto, applying heat, if necessary, to insure that the entire mass would remain molten for a length of time sufficient to effect the removal of the magnesium. The process was selective in that magnesium was removed whereas other metals such as copper, zinc, silicon, and manganese remained with the aluminum.

The following patents disclose processes for producing aluminum and lithium:
U.S. Pat. No. 710,493, Moeser et al.
U.S. Pat. No. 1,180,435, Robison, C.S.
U.S. Pat. No. 2,028,390, Hanson, M.G.
U.S. Pat. No. 2,470,305, Gross, P.
U.S. Pat. No. 2,621,120, Pedersen et al.
U.S. Pat. No. 2,810,635, Cooper, H.S.
U.S. Pat. No. 3,397,056, Layne et al.
U.S. Pat. No. 3,856,511, Becker et al.
Great Britain, No. 623,932, Phillip Gross
Great Britain, No. 635,318, Ardel Verk In addition to the foregoing, two basic methods are known in the aluminum industry for the removal of magnesium from molten aluminum alloys. The generally accepted method is to bubble chlorine gas through the molten alloy until sufficient magnesium has been removed as magnesium chloride. A less commonly used method is to cover a molten bath with a flux of metal fluoride. This method is less noxious and poses fewer safety problems, but is much slower than the chlorine process. Although the second method utilizes nonnoxious chemicals, resultant particulate emissions are considered hazardous waste. Aluminum smelting facilities use standard "baghouses" that readily control these emissions.

It is known that lithium behaves similarly to magnesium and would react with chlorine or fluorine. Both of the above methods could be used for lithium extraction but because aluminum-lithium alloys oxidize readily in air and attack the refractory furnace linings, these methods are not practical for normal extraction operations, because they require mixing the flux into a molten metal bath or bubbling reactants through the bath. The methods are also time consuming. In addition, the large primary producers of aluminum-lithium alloys have had to use special refractories to keep reactions to a minimum.

DISCLOSURE OF THE INVENTION

The invention is a method of removing lithium from aluminum-lithium alloys in which an aluminum-lithium alloy or alloys and metal halide flux are fed into a relatively cool and raised end of a sloping rotary barrel-type furnace, for example. The alloys contain an amount of lithium sufficient to significantly lighten the alloys but not enough to weaken the alloys for a pratical use. The temperature of the cool end is maintained above that of the melting point of the flux and approximately at or below the melting point of the alloy. The flux is thus melted and the molten flux coats the solid alloy to prevent the alloy and the lithium from oxidizing.

The refractory lining of the furnace is also coated with the flux to prevent contact between the refractories and the molten metal until the lithium content of the aluminum has been reduced to a low level. Refractory life is therefore not affected by the presence of the lithium. The furnace is rotated to transfer the alloy and the molten flux toward a lower and hotter end. The furnace is heated sufficiently to melt the alloy adjacent the hotter end. Thus, as the alloy is melted, the lithium is removed therefrom and is chemically absorbed into the flux. The molten aluminum is then drained from the lower end of the furnace, or held there to be alloyed with other metals. By this method the lithium in an alloy is reduced to less than thirty parts per million. Magnesium in the alloy may, if required, also be be removed along with the lithium.

The surrounding of the alloy by the flux prevents the aluminum and lithium from oxidizing as they are melted. This is necessary because the aluminum-lithium alloy is very reactive when molten and will oxidize very rapidly, compared to nonlithium containing alloys. By preventing oxidation, the economics of the process is enhanced in that a higher percentage of available aluminum is recovered.

The invention also provides a rapid method of extraction of lithium. The lithium is removed as the alloy is melted, but a large bath of metal is not formed until the lithium is extracted and absorbed by the flux.

A primary purpose of the invention is to remove lithium from aluminum-lithium scrap for converting it into alloys suitable for die casting or sand casting. The method also is suitable for reclaiming aluminum from mixtures of aluminum-lithium and other aluminum alloy scrap. This method also has the advantage of reprocessing aluminum-lithium scrap without using noxious chemicals and enables a high percentage of aluminum to be recovered.

Further advantages of the invention will be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes.

BEST MODE FOR CARRYING OUT THE INVENTION

Figure 1:
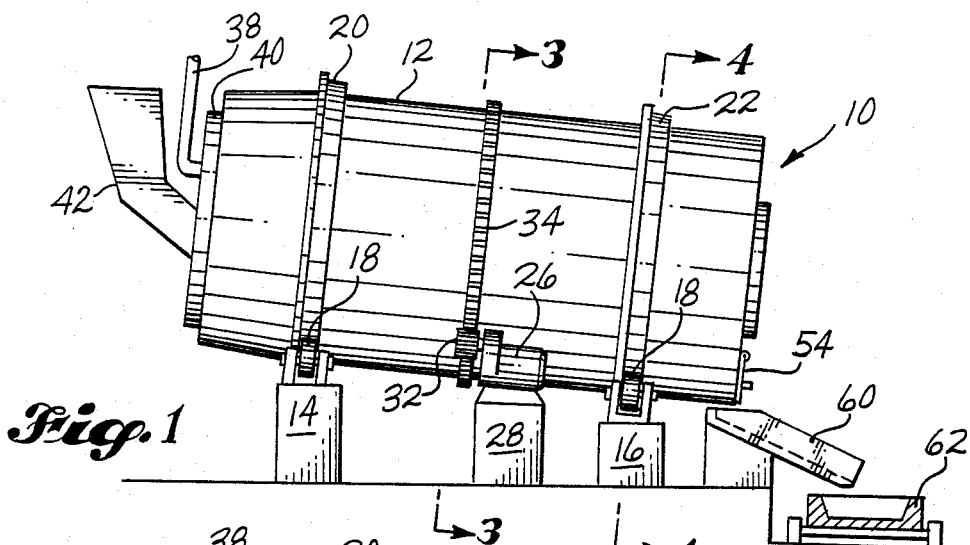
FIG. 1 is a side elevational view of a rotary barrel smelting furnace.
Figure 2:
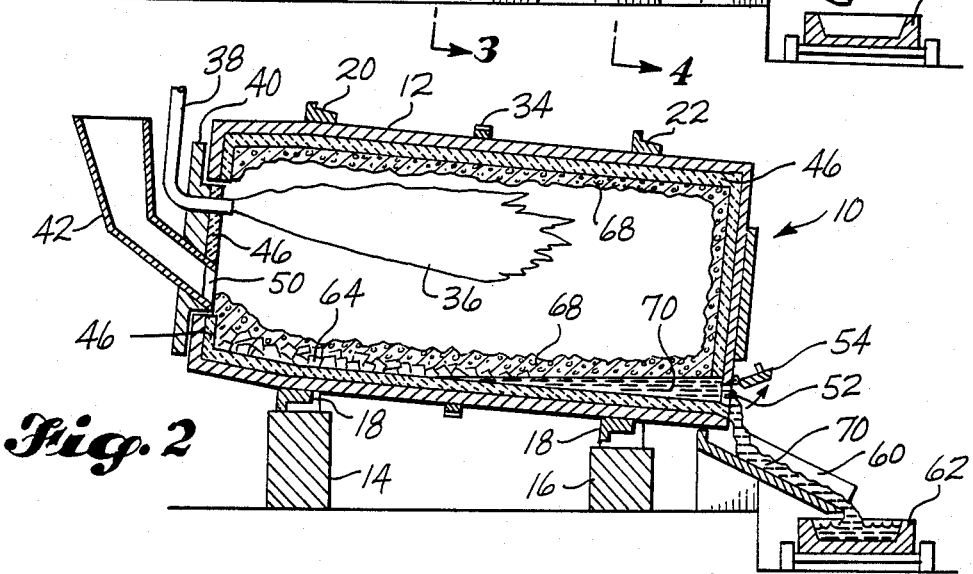
FIG. 2 is a cross-sectional side view of the furnace shown in FIG. 1.
Figures 3, 4:
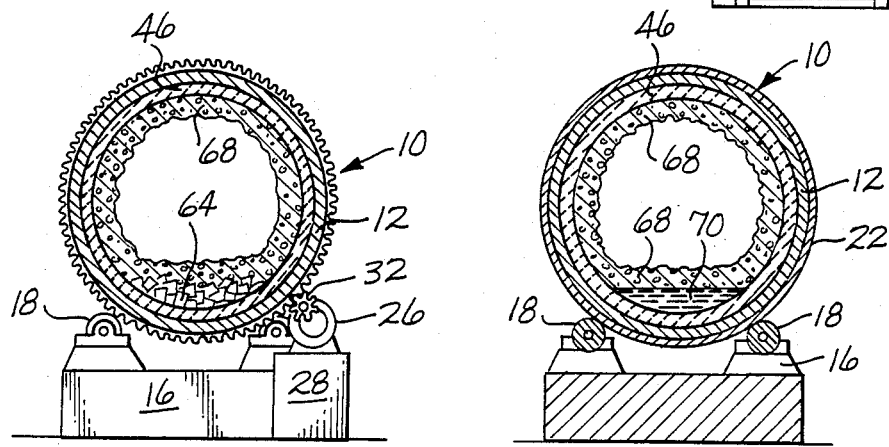
FIG. 3 is a cross-sectional transverse view of the furnace, taken along the line 3—3 in FIG. 1.
FIG. 4 is a cross-sectional transverse view of the furnace, taken along the line 4—4 in FIG. 1.

Referring again to the drawings, therein is shown a rotary barrel furnace, generally designated as 10, having a generally cylindrical body 12 mounted on supports 14 and 16. The furnace is shown to be sloping at an angle of scrap about 5° but may be positioned to slope in the range of approximately 0° to 10°, depending on the type of scrap being processed. In some situations a slope is not required. On the top of the supports are rollers 18 engaged in supporting and rotational contact with tracks 20 and 22, surrounding and fixed to the cylindrical body 12.

A motor 26 is fixed on a support 28 and has a spur gear 32 on its drive shaft in driving engagement with an external ring gear 34 fixed on the external surface of the body 12. The motor may rotate the furnace in the range of 1 to 10 RPM but typically is adapted to rotate at the rate of 2 RPM.

The furnace is gas or oil heated and the gas/oil is supplied through a tube 38 extending through a fixed nonrotatable end plate 40, supported by means not shown. A flame 36 is adjusted to heat the upper end of the furnace at a relatively low temperature to melt the flux and is adapted to heat the area of the furnace adjacent the lower end to a higher temperature to melt the aluminum.

An inlet hopper extends through the plate 40 and it is open to the interior of the furnace. The furnace is lined with refractories 46 inside of the cylindrical body except for an opening 50 in the plate 40 and an area of the discharge opening 52 closed by a door 54 during operation. Positioned at the lower and hotter end of the furnace is a drain spout 60 for discharging molten material into a basin 62.

In operation, the furnace 10 is used in a batch process to remove lithium from aluminum-lithium alloys, in which the alloys contain an amount of lithium sufficient to significantly lighten the alloys but not enough to weaken the alloys for a practical use. Magnesium can also be removed and in the same process further alloying can be accomplished. Typically, the alloys 64 are in the form of scrap and the scrap and a flux 68 is fed into the cooler and higher end of the furnace through the hopper 42. The flux 68 is comprised of a mixture of aluminum fluoride and potassium fluoride, known as KALF, and a mixture of potassium chloride and sodium chloride. The fluorides are in the range of 35 to 75 weight percent of the flux and the chlorides are in the range of 25 and 65 weight percent of the flux. The fluoride mixture is formed of 50% of aluminum fluoride and 50% of potassium fluoride and in the chloride mixture 40% is potassium chloride and 60% is sodium chloride. A common flux is formed of 65% of the fluorides and 35% of the chlorides by weight.

For every 100 lbs. of the alloy between 16 lbs. and 24 lbs. of the flux is added, the ratio being typically 5 to 1, metal to flux.

The flame 36 from the burning fuel extends about ⅔ of the way into the furnace. The maximum temperature for the cool end is about 1300° F. and the typical operating temperature is about 1150° F. The temperature adjacent the lower and hotter end of the furnace is in the range of 1350° to 1500° F. which is sufficient to melt the aluminum in the alloy. Thus, the flux melts as soon as it enters the furnace so as to surround the heavier alloy and to coat the entire refractory surface of the furnace as the furnace rotates. Some of the molten flux drops down from the upper part of the furnace but the continuous rotation adds molten flux to the coating. As the alloy and molten flux are mixed together, they are slowly fed along the furnace during the rotation and down the slope toward the hot end.

As the alloy pieces melt, they give up their lithium to the flux; that is, the lithium is chemically absorbed by the flux. Thus, the furnace refractories never come into contact with molten aluminum-lithium alloy and only molten aluminum 70, from which the lithium has been extracted, comes into contact with the refractories at the lower end of the furnace as it is melted and is in position for discharge through the openings 52 into the trough 60.

Thus, in the operation the aluminum-lithium alloy and flux are so mixed so as the flux melts it forms a coating on the solid alloy before it can oxidize. By preventing oxidation of the aluminum, as well as the lithium, a high aluminum recovery rate is assured and the lithium content of the molten aluminum is reduced to less than thirty parts per million.

The aluminum 70 discharged into the basin 62 is ready for converting it into alloys suitable for die casting or sand casting. The method also has the advantage of reprocessing aluminum-lithium scrap utilizing nonnoxious chemicals. By keeping the alloy scrap coated and the lithium absorbed in the flux after it is freed from the alloy, the refractories are protected so as to prevent their deterioration.

The molten flux is discharged from the furnace after all of the molten aluminum has been discharged.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. We do not wish to be restricted to the specific forms shown or uses mentioned except as defined in the accompanying claims.

What is claimed is:

1. A method of removing lithium from aluminum-lithium alloys, in which the alloys contain an amount of lithium sufficient ot significantly lighten the alloys but not enough to weaken the alloys for a practical use, comprising:
    providing a rotary furnace having a first end, a second end, and a refractory lining;
    feeding solid aluminum-lithium alloy and solid metal halide flux into the first end of the rotary furnace;
    maintaining the temperature of the first end of the furnace above that of the melting point of the flux and approximately at or below the melting point of the alloy;
    melting the flux in the first end of the furnace to form a molten flux;
    coating the solid alloy with the molten flux to prevent the alloy from oxidizing;
    coating the refractory lining with flux to prevent contact between the refractory lining and molten alloy until lithium has been removed from the alloy;
    rotating the furnace to move the alloy and molten flux toward the second end of the furnace;
    heating the furnace sufficiently to melt the alloy adjacent the second end; and
    removing the lithium from the alloy and chemically absorbing the lithium with the flux.
2. A method according to claim 1, including:
    positioning the rotary furnace to slope so that the first end is higher than the second end.
3. A method according the claim 1, including:
    draining the molten aluminum from the second end of the furnace.
4. A method according to claim 1, including:
    alloying the molten aluminum in the furnace with other metals.
5. A method according to claim 1, including:
    reducing the lithium in the alloy to less than 30 parts per million.
6. A method according to claim 1 in which the flux is comprised of:
    a mixture of aluminum fluoride and potassium fluoride, the fluoride mixture forming between 35% and 75% by weight of the flux; and
    a mixture of potassium chloride and sodium chloride, the chloride mixture forming between 25% and 65% by weight of the flux.
7. A method according to claim 3 in which:
    the fluoride mixture is formed of 50% of aluminum fluoride and 50% of potassium fluoride by weight; and
    the chloride mixture is formed of 40% potassium chloride and 60% sodium chloride by weight.
8. A method according to claim 1 in which the flux is comprised of:
    a mixture of aluminum fluoride and potassium fluoride, the fluoride mixture forming 65% of the flux by weight; and
    a mixture of potassium chloride and sodium chloride, the chloride mixture forming 35% of the flux by weight.
9. A method according to claim 1 including:
    feeding between 16 lbs. and 24 lbs. of flux into the furnace for 100 lbs. of alloy.
10. A method according to claim 2 including:
    positioning the furnace to slope at angles of up to about 10°.
11. A method according to claim 1 including:
    heating the first end of the furnace to about 1150° F.; and;
    heating the second end of the furnace to the range of 1350° F. to 1500° F.
12. A method according to claim 1 including:
    rotating the furnace at the rate of between 1 RPM and 10 RPM.
13. A method according to claim 2 including:
    positioning the furnace to slope at an angle of about 5°.
14. A method according to claim 1 including:
    feeding approximately 1 lbs. of flux into the furnace for five lbs. of alloy.

* * * * *

UNITED STATES PATENT AND TRADEMARK OFFICE
CERTIFICATE OF CORRECTION

PATENT NO. : 4,822,412

DATED : April 18, 1989

INVENTOR(S) : D. V. Badger, B. L. Small and P. K. Stanfeld

It is certified that error appears in the above-identified patent and that said Letters Patent is hereby corrected as shown below:

In the Abstract, the eighth line from the bottom, "unitl" should be -- until --.

Col. 1, line 19, "us" should be -- use --.

Col. 2, line 31, "minute" should be -- minutes --.

Col. 4, line 43, after "hopper", insert -- 42 --.

Claim 1, col. 5, line 63, "furnance" should be -- furnace --.

Claim 14, col. 6, line 66, "lbs." should be -- lb. --.

Signed and Sealed this

Eighth Day of May, 1990

Attest:

HARRY F. MANBECK, JR.

*Attesting Officer*  *Commissioner of Patents and Trademarks*